UNITED STATES PATENT OFFICE.

WILHELM SCHUMACHER, OF OSNABRÜCK, GERMANY.

PROCESS OF INCREASING THE BINDING POWER OF BASIC SILICATES OF LIME.

1,003,813.  Specification of Letters Patent.  Patented Sept. 19, 1911.

No Drawing.  Application filed May 31, 1906. Serial No. 319,510.

*To all whom it may concern:*

Be it known that I, WILHELM SCHUMACHER, chemist and subject of the King of Prussia, residing at Osnabrück, in the Kingdom of Prussia, German Empire, have invented a new and useful Improvement in the Process of Increasing the Binding Power of Basic Silicates of Lime, of which the following is a full, clear, and exact description.

It is known that by simply adding certain quantities of quartz powder of a fineness similar to that of cement to a standard mixture of one part Portland cement and two parts sand, the strength of the cement body or block obtained is increased. Of course, in this case no chemical action of the quartz upon cement takes place, but only a physical action. However, the effect of the addition of quartz powder can be greatly increased if the cement blocks are submitted to the action of steam under pressure, preferably after the solidifying or hydration of the cement. As known, on the hydration of the cement lime is set free, and it is this latter which, on being treated with steam combines with the added silica (quartz) to form silicate of lime, whereby the strength of the cement blocks is very considerably increased. By a great number of trials it has been established that the greatest strengths result if to the cement so much quartz powder is added, that the quantity of the latter together with the silica of the cement is approximately equal to the amount of lime. The most favorable addition of silica for each kind of cement can easily be found by way of experiment.

It is well known that if a fine sand is used in connection with cement, a greater amount of cement is necessary to form a block than when coarser sand is used. This is necessitated because of the greater amount of sand surface caused by the division into fine particles. I have found, however, that by adding a certain proportion of powdered quartz, a less amount of cement is necessary, than what was formerly required to bind together the particles of a cement block, while at the same time a much stronger block is made. It is believed that such result is obtained because of a chemical reaction between the cement and the quartz in the presence of steam under pressure.

Of course instead of the Portland cement any other basic silicate of lime, and particularly blast furnace slag may be used. In using this latter it is in many cases preferable to add small quantities of lime in order to expedite the hydration or solidification.

The addition of quartz powder is also useful in the manufacture of slag stones, that is, articles made from granulated blast furnace slag, when such articles are hardened by steam. Even if no trace of ground slag is used, the addition of fine quartz powder to the granular slag will greatly enhance the effect of the steam treatment and increase the strength of the product.

The addition of quartz powder to basic silicates of lime is of particular importance in those cases in which it is desired to obtain the greatest possible strength with a minimum of binding material, *e. g.*, the agglomeration of pulverulent ores (making of briquets), where, by the addition of binding means the ore is rendered impure and reduced in value.

Of course it is possible to add to the basic silicates of lime, besides the quartz powder, also other materials as used heretofore for certain purposes, for instance, lime, gypsum, asphaltum, stearin, etc.

What I claim is:

1. The process herein described of increasing the binding power of basic silicates of lime, which consists in adding thereto fine quartz powder, the total amount of silicate present in the mixture thus formed not to exceed the amount of lime, and subjecting the total mass to the action of steam under pressure.

2. The method herein described of increasing the binding power of basic silicates of lime, which consists in adding thereto fine quartz powder, the total amount of silicate present in the mixture thus formed not to exceed the amount of lime, and also adding thereto other materials such as lime, gypsum, asphaltum and stearin, and subjecting the entire mass to the action of steam under pressure.

3. The method herein described of increasing the binding power of basic silicates of lime which consists in adding quartz powder thereto, the total amount of silicate present in the mixture thus formed not to exceed the amount of lime, forming the mass in the blocks and subjecting said blocks to the action of steam under pressure.

4. The process herein described of increasing the binding power of basic silicates of lime, which consists in adding thereto lime and fine quartz powder, the total amount of silica present in the mixture thus formed not to exceed the total amount of lime present
5 therein, and subjecting the resulting mass to the action of steam under pressure.

In witness whereof, I have hereunto signed my name in the presence of two subscribing witnesses.

WILHELM SCHUMACHER.

Witnesses:
FERDINAND REICH,
FREDERICK HOYERMANN.